A. A. JOHNSON.
COMBINED TYPEWRITING AND COMPUTING MACHINE.
APPLICATION FILED MAY 6, 1918.

1,332,218.

Patented Mar. 2, 1920.
7 SHEETS—SHEET 1.

WITNESSES:

INVENTOR:
Arthur A Johnson
BY
ATTORNEY.

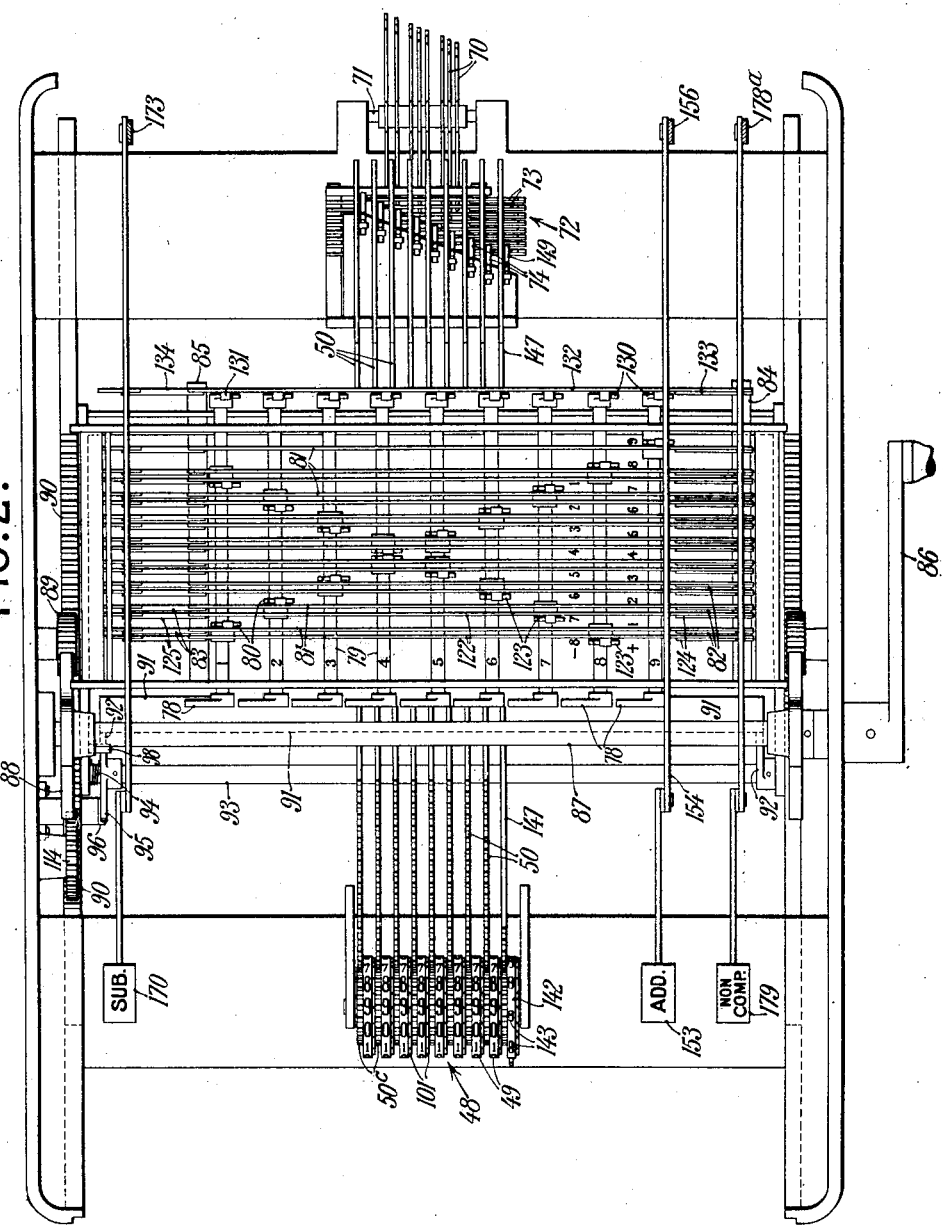

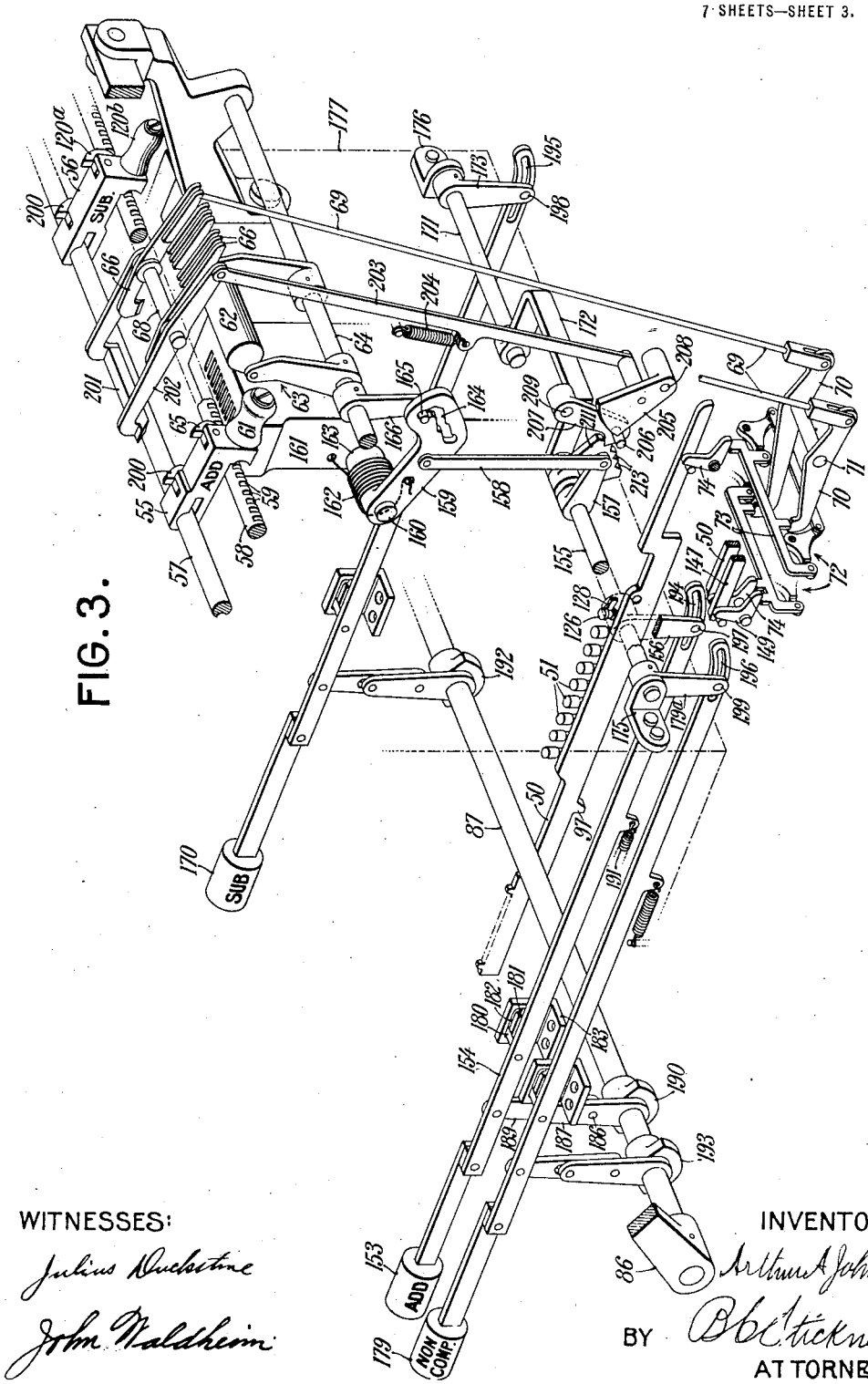

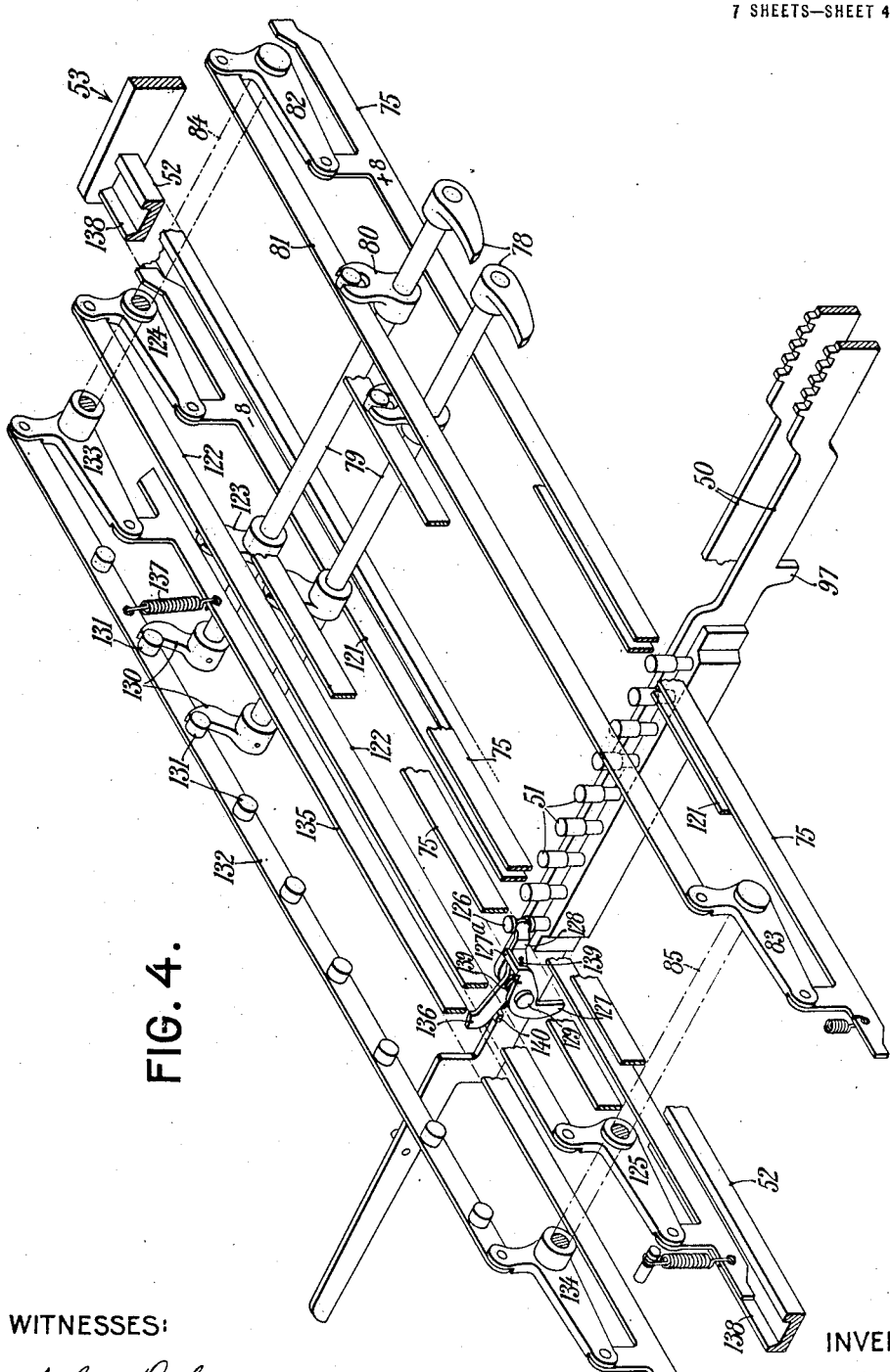

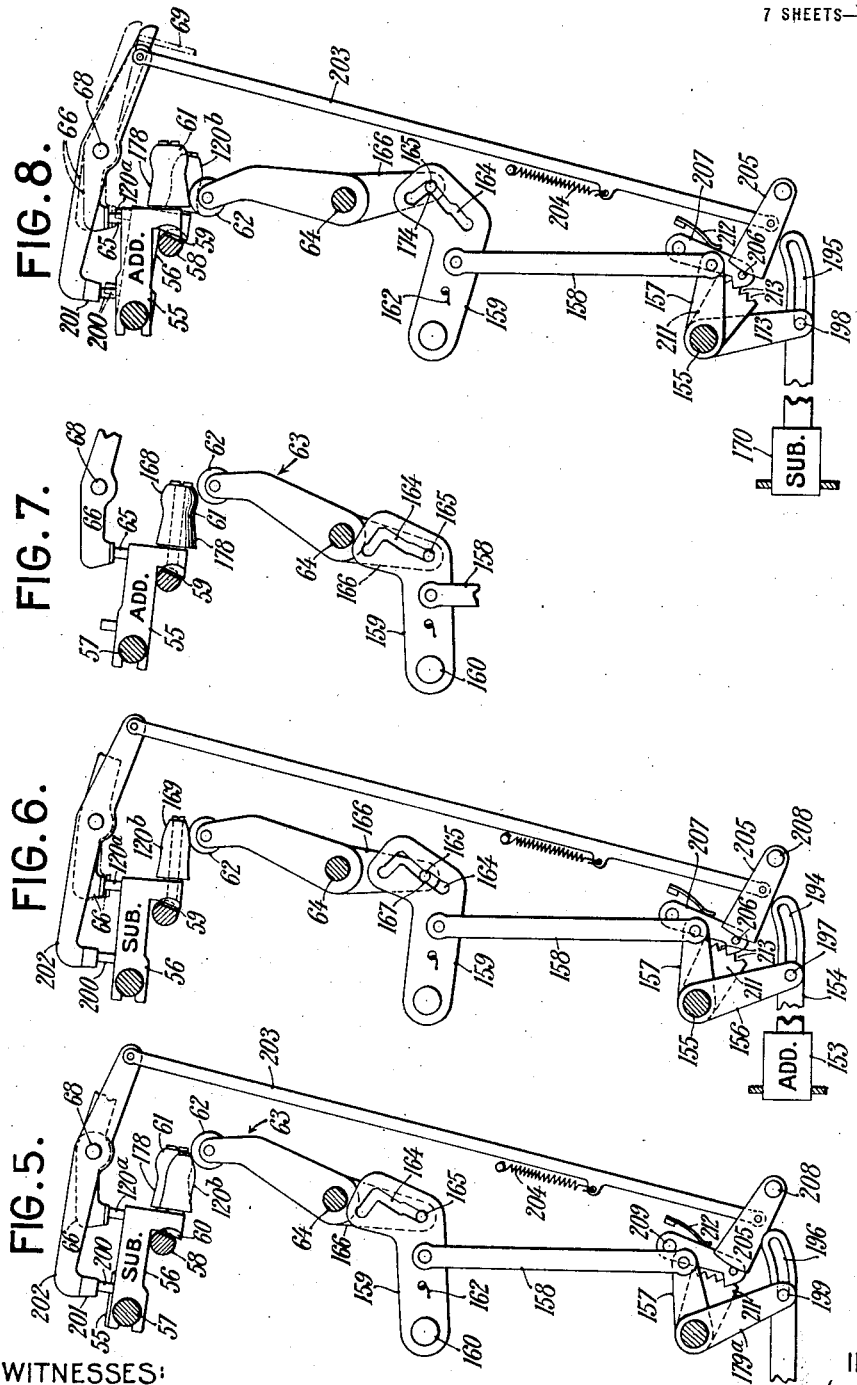

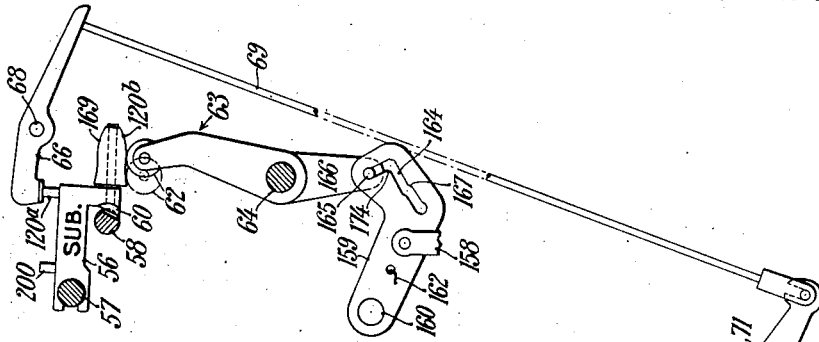

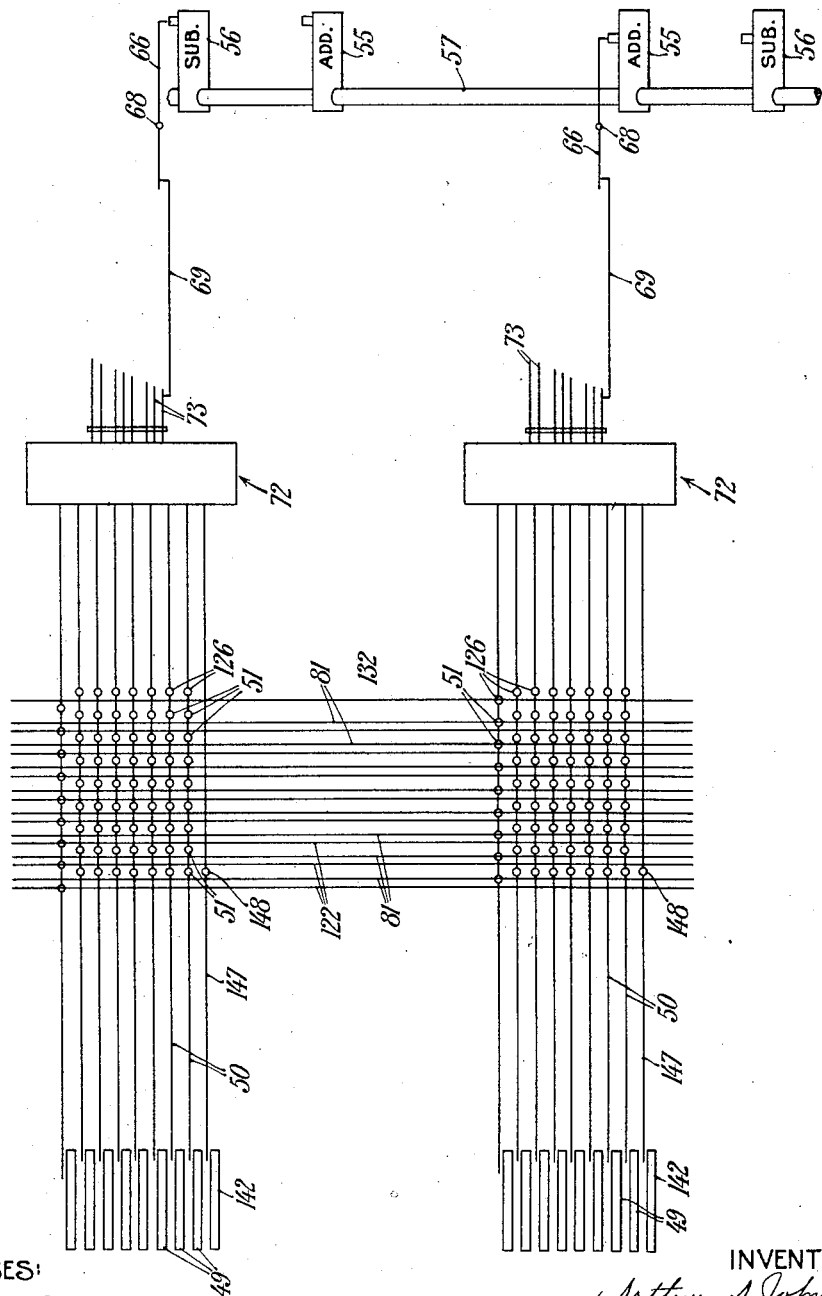

UNITED STATES PATENT OFFICE.

ARTHUR A. JOHNSON, OF NEW YORK, N. Y., ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,332,218.

Specification of Letters Patent.  Patented Mar. 2, 1920.

Application filed May 6, 1918. Serial No. 232,746.

*To all whom it may concern:*

Be it known that I, ARTHUR A. JOHNSON, a citizen of the United States, residing in borough of the Bronx, in the county of the Bronx, city and State of New York, have invented certain new and useful Improvements in Combined Typewriting and Computing Machines, of which the following is a specification.

This invention relates to combined typewriting and computing machines adapted to add and subtract.

The invention is shown applied to an Underwood-Hanson machine, such as shown in the patent to F. A. Hart, No. 1,190,171, of July 4, 1916, and in the application to Ogden Minton, Serial No. 797,714, filed October 28, 1913 (now Patent No. 1,280,065, dated September 24, 1918).

In said patent and said application, there is shown a register comprising dial wheels which may be driven through different extents by a general operator, through the intermediary of index-pin racks or bars, of which there is one for each dial. Each rack has nine index-pins thereon, which may be set by the numeral keys. These pins normally are out of effective range of their setting bars, which extend crosswise of the pin-carrying bars; there being one setting-bar for each numeral key, each setting-bar being adapted to set the pin equal in value to the digit on the associated numeral key.

The pin-carrying bars in said patent and application are rendered effective one at a time as the typewriter carriage passes through a computing zone. In other words, they are shifted successively to a position where the pins may be set by their respective key-operated setting-bars. This shifting is done by a denominational selector or dog on the typewriter carriage, which, as the typewriter carriage enters a computing zone, shifts first the pin-carrying bar of highest denomination, and then the others in succession.

In said Minton application, the rows of pins are normally somewhat to the rear of their associated setting-bars, and when the pin-carrying bars are rendered effective by the denominational selecting means they are each shifted forwardly, one at a time, to bring the pins under the respective setting-bars. If a numeral key is then depressed, the setting-bar controlled thereby is moved downwardly to set the pin underneath said bar, thus bringing the lower end of the pin into the path of a general operator. After the pins have been set, in a similar manner, on all the bars, the general operator is actuated to drive the pin-carrying bars and the dial wheels.

In carrying out the present invention, in which there is employed a complementary method of subtraction, there are provided two sets of setting bars. One bar of each set is associated with each of the numeral keys including the keys from "1" to "8", inclusive. These setting bars are grouped in pairs, each pair forming a unit, and are so located that the two bars in each group or unit have complementary values. Thus, a bar controlled by the "1" key and a bar controlled by the "8" key form one group or pair; a bar controlled by the "2" key and a bar controlled by the "7" key form another group or pair, etc.

Each pin-carrying bar may be shifted forwardly for pin-setting as in the Minton application, but in the present invention means are provided whereby the pin-carrying bars may be moved to two effective positions, one position for addition when the pins are brought under the pin-setting bars which have values equivalent to their associated numeral keys, and another position for subtraction when the pins are brought under the setting bars having values equivalent to the complements of the associated numeral keys. To accomplish this, the denominational selectors or dogs on the typewriter carriage are differently shaped, so as to transmit one or another movement to the pin bars.

In the Minton application, herein mentioned, the complementary method of subtraction is also used, and there is provided means controlled by the state-setting means to set all of the "9" pins on the pin-carrying bars, when the machine is set to subtraction. This is done for a purpose well known to those skilled in the art.

In the present invention, however, the "9" pins are set individually during the denominational selecting of the pin-carrying bars, when the carriage passes through a computing zone. For this purpose, each pin-carrying bar is provided with means, by which, when the bar is moved to the subtraction position, it depresses the "9" pin to its effective position.

To compensate for the extra digit in the units position in the complementary method of substraction, there is preferably employed a toothed wheel adjacent to the units dial. This wheel is driven by a special rack. This rack has a "1" pin thereon which is settable by the cross-bar of the general operator when a forward shift is transmitted to the rack bar by the denomination-selector on the carriage.

This rack and the units pin-bar are moved forward simultaneously by the denomination-selector, thus bringing the pins on the units bar into effective relation with the setting-bars, and setting the "9" pin thereon, and also setting the "1" pin on the special rack bar.

The denomination-selecting addition and subtraction dogs ride upon a roller while passing through a computing zone. This roller is shiftable to bring either dog into use.

Another feature of the present invention is the provision of means to control all of the denomination-selecting dogs so as to effect thereby the same kind of computation (addition or subtraction), irrespective of whether they are addition or subtraction dogs.

To do this, I set the roller, which renders the dogs effective, to various abnormal positions. In one position the dogs may be rendered effective for addition. Another position of said roller causes all of the dogs to effect subtraction. The roller may be caused to occupy still another position which disconnects the computing mechanism, or, in other words, neutralizes the computing effect of the machine.

To move this roller to its various positions, I have provided addition, subtraction and silencing keys at the front of the machine.

Thus, there are two kinds of denomination-selectors, one for addition and the other for subtraction. The roller normally occupies a position to render each selector effective for the computation to be performed thereby. The position of the roller may be changed, to cause all of the selectors to perform either addition or subtraction; and the roller may be moved to an ineffective position.

The present invention further includes means to prevent changing from one kind of computation to another, while the carriage is in a computing zone, and thus avoid an erroneous action of the machine.

Other features and advantages will hereinafter appear.

In the accompanying drawings,

Fig. 2 is a top-plan view of the machine with the typewriter removed, and showing principally the register, the driving members or racks associated therewith, and the pin-setting mechanism which is controlled by the numeral keys.

Fig. 3 is a skeleton, perspective view of my invention.

Fig. 4 is a skeleton, perspective view, showing the pin-setting mechanism for the rack bars.

Fig. 5 is a diagrammatic view of some of the parts seen in Fig. 1, showing the silencing or non-compute key actuated, the roller, with which the denomination-selectors engage, moved to an ineffective or neutral position by said key, and the connections to said roller locked by means controlled from a denomination-selector.

Fig. 6 is a view similar to Fig. 5, showing the roller set to a position to render all of the denomination-selectors effective for addition; the selector in this figure being a subtraction denomination-selector.

Fig. 7 shows the roller in a non-compute position, as in Fig. 5, and the relation which the addition denomination-selector bears thereto when in this position.

Fig. 8 is a view similar to Fig. 5, showing the roller in a position to cause all of the denomination-selectors to effect subtraction.

Fig. 9 is a diagrammatic view, showing a portion of a rack bar as moved to a pin-setting position for addition.

Fig. 10 is a view similar to Fig. 9, showing the rack bar as moved forwardly to a subtraction pin-setting position, and the "9" pin depressed by a setting-device or finger on said bar.

Fig. 11 is a view similar to Fig. 10, but shows the "9" pin retracted by setting one of the other pins.

Fig. 12 is a view showing a cross-bar forming part of the general-operator as moving forwardly, and how the setting-finger, which is used to set the "9" pin, gets in back of said cross-bar.

Fig. 13 is a top view of a portion of a rack bar, showing how the "9" pin-setting mechanism is mounted thereon.

Fig. 14 shows a lost-motion one-way driving connection between a driving rack and a dial wheel.

Fig. 15 shows one of the pin-carrying rack bars as moved forwardly to a subtraction pin-setting position by the subtraction denomination-selector; and the lost-motion between the rack and the dial wheel as having been taken up.

Fig. 16 is a view showing the special rack bar and the means for setting the pin thereon.

Fig. 17 is a schematic view, showing two registers and how simultaneous addition and subtraction may be effected therein by means of the denomination-selectors on the typewriter carriage.

Figure 1:
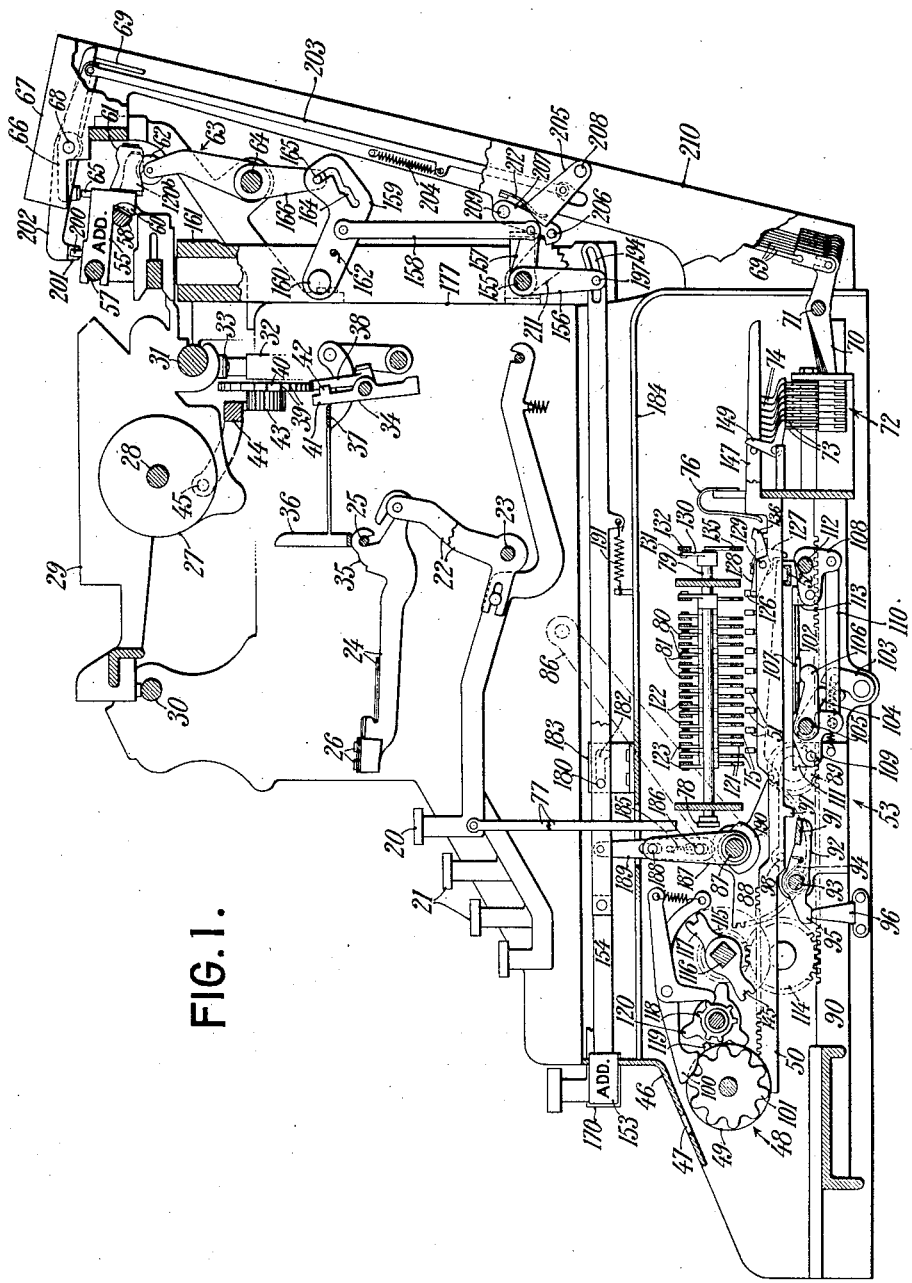
Figure 1 is a sectional side elevation of a combined typewriting and computing machine of the Underwood-Hanson type, showing my improvements applied thereto.

Numeral keys 20 and alphabet keys 21, when actuated, swing bell cranks 22 about a fulcrum 23 to cause type-bars 24 to move about a fulcrum 25 and swing types 26 upwardly and rearwardly to print against the front side of a platen 27. The platen is rotatively mounted by means of a platen axle 28 on a carriage 29, so that it may be rotated to feed a work-sheet (not shown) by the usual line-spacing mechanism, as in the Underwood machine. The carriage 29 is supported on a front rail 30 and a rear rail 31 and is adapted to ride back and forth thereon. The carriage is constantly urged leftwardly by a spring drum 32 connected thereto by a suitable strap 33 for the purpose of effecting letter-feeding movements of said carriage.

These letter-feeding movements are controlled by an escapement mechanism comprising a dog rocker 34 and are effected by the type-bars 24, each type-bar, for this purpose, being provided with a heel 35, which, as the type-bar approaches the printing point, engages with a curved universal bar 36 to move the latter rearwardly; a cross-bar 37 thereon engaging with the dog rocker 34 to move a loose dog 38 carried thereon out of engagement with one of the teeth 39 of an escapement wheel 40. At the same time, however, a fixed dog 41 on the dog rocker 34 is brought into engagement with the escapement wheel, thus permitting a slight movement of the latter. When the type-bar returns to its normal position, the universal bar 36 and the dog rocker 34 are also returned to their normal positions by suitable springs (not shown); thus the fixed dog is withdrawn and the loose dog permitted to come into engagement with the next succeeding one of the teeth 39 of the escapement wheel 40, thereby permitting the movement of the escapement wheel 40 until the loose dog is arrested by a stop 42 on the dog rocker 34. The escapement wheel 40 has the usual one-way pawl connection (not shown) with a pinion 43, the latter meshing with a feed rack 44 which is pivotally supported on the carriage 29 at 45; thus, the carriage is caused to move letter-space distances by means of the spring drum 32 and the escapement mechanism.

In the Underwood-Hanson machine, most of the computing mechanism is embodied in a casing 46 arranged underneath the typewriting machine. This casing has a sight opening 47 for each register 48 through which the number on the dial wheels 49 of the register may be seen. Each dial wheel has associated therewith a driving member 50 with which it has a one-way driving connection. These driving members 50 are in the nature of rack-bars having pins 51 thereon which may be set so that the rack-bars may be driven forwardly various distances, according to the pins set thereon, by a cross-bar 52 of a general operator 53.

The one-way connection between each driving rack or pin-bar 50 and the associated dial wheel 49 comprises a pinion 50$^a$ (Fig. 14), engaging with said rack-bar 50, and a ratchet wheel 50$^b$ secured to each pinion. The ratchet wheel 50$^b$ engages with a spring-pressed pawl 54 on the dial wheel 49, so as to drive the dial wheel in a clockwise direction only.

Each rack-bar 50 is provided with nine indexing pins 51, ranging in value from "1" to "9"; the pins of equivalent value, as for example the "1" pins, the "2" pins, the "3" pins, etc., of the different rack-bars forming rows extending crosswise of said rack-bars. The rack-bars 50 are movable individually to two pin-setting positions (addition and subtraction). For this purpose, I have provided two kinds of selecting elements or denominational selectors 55 and 56 on the typewriter carriage, one kind (55) for addition, and the other kind (56) for subtraction. These selectors are supported on a rod 57 on the carriage 29 and settable lengthwise of the carriage at columnar positions thereof, where they are held by means of a bar 58 in which there are notches 59; the teeth 60 on said selectors engaging in said notches.

Just prior to the arrival at the printing point, of a column in which the typed numbers are to be added into the register, the addition selector or dog 55 is raised to an effective position by means of a roller 61 thereon, which rides on a roller 62 of a device 63 which is in the form of a bail supported on a rock shaft 64. This raising of the selector or dog 55 brings a tappet 65 thereon into coöperative relation with a group of pivoted jacks 66 located near the middle of the machine and contained within a hood 67; there being one of these jacks 66 for each pin-bar 50. As the typewriter carriage advances to the position of highest denomination in the column, the tappet 65 engages with the jack of highest denominational position, which is located to the right of the group of jacks; the forward end of said jack 66 is raised to swing it about its pivot 68, to push downwardly a link 69, to swing a lever 70 near the lower part of the machine about its pivot 71, and, through a suitable transposition linkage 72, including a horizontal bar 73, forms a cross-connection to the pin-bar of highest denominational position located at the left of the group of pin-bars. This pin-bar is moved forwardly by means of a bell-crank 74 to bring the pins 51 thereon under pin-setting bars 75, which extend crosswise of said bars 50 and parallel to the rows of pins; there being one pin-setting bar 75 under the control of each numeral key. While the carriage is in this (highest denominational) position, the pin-bar is held in its forward or pin-setting position. If any one of the numeral keys 20 is now actuated, the associated pin-setting bar 75 is actuated to depress the pin 51 thereunder, to bring the lower end of the pin into the path of the cross-bar 52 of the general operator 53.

Each pin-bar 50 when moved forwardly to its pin-setting position moves against the tension of a suitable return spring 76, which, after the tappet 65 moves out of engagement with the jack 66, returns the pin-bar to its normal position.

To actuate the pin-setting bars 75 (herein referred to for convenience as positive pin-setting bars), each numeral key is provided with a pendant 77, which, when the key is actuated, engages with a horizontally-disposed arm 78 extending leftwardly from a shaft 79 at the forward end thereof, to rock the latter in a counter-clockwise direction (Fig. 4). By an inspection of Fig. 2, it will be seen that there are nine rock shafts 79, one for each of the numeral keys, having values from "1" to "9," inclusive. Each rock shaft is provided with an upwardly-projecting arm 80, Fig. 4, which, when the rock shaft is actuated, moves a connecting link 81 leftwardly to swing bell-cranks 82 and 83, one at each end thereof, about their respective pivots 84 and 85, so that the pin-setting bar 75 carried thereby is lowered to set the pin 51 on the pin-bar.

After a number has been typed in the highest denominational position and consequently the corresponding pin set on the bar 50, the carriage is permitted to escape to the next letter-space position, during the return movement of the type-bar, as hereinbefore described. During this movement of the carriage, the rack bar of highest denominational position is returned, by the spring 76, to its normal position, while the rack-bar of next highest denominational position is moved forwardly to its pin-setting position, by the tappet, 65, engaging with the jack 66 of next highest denominational position. Thus, it will be seen that, while the carriage passes through a computing zone, the tappet 65 engages with the jacks successively to move the corresponding pin-bars to pin-setting positions, and that the pins are set by the numeral keys.

After a combination of pins has been set on the pin-bars, which corresponds to the number typed, the general-operator 53 is actuated. This may be done by an operating handle 86 which rocks a shaft 87 to which it is secured. A gear sector 88 fixed on said shaft 87 meshes with pinion 89 to drive a rack-bar 90 forming part of the general-operator 53. As the general-operator 53 moves forwardly, the cross-bar 52 thereof engages with the lower ends of those pins 51 which are in a set position on their respective rack-bars 50 to move the rack-bars forwardly extents equal in value to the set pins, thus rotating the dial wheels associated therewith through the proper angular distances.

The rack-bars or driving members are restored to their normal positions upon the return-stroke of the general-operator by a pivoted cross-bar 91 thereon. This cross-bar is carried by arms 92 projecting rearwardly from a rock-shaft 93 carried by the general operator, and the cross-bar 91 is normally held in a lowered position against the tension of the spring 94 coiled about the shaft 93, by means of an arm 95 projecting rearwardly from said rock shaft 93 which engages with an obstruction 96 on the casing 46. This is done to avoid interference of the cross-bar with the pin-bars 50 during their preliminary movements to pin-setting positions. During the forward movement of the general operator, however, the cross-bar is swung upwardly by means of the spring 94 and into the path of projections 97 on the rack-bars; the upward movement of said cross-bar 91 being limited by a suitable stop pin 98. The cross-bar will remain in this position during the balance of the forward movement of the general operator, and is effective, on its return stroke, to restore the rack-bars until they are brought under the control of the individual springs 76 associated with said rack-bars, after which the arm 95 engages with the obstruction 96 to swing the cross-bar 91 to its lower or normal position.

During the return-stroke of the driving rack, the ratchet wheels 50$^b$ are driven in a counter-clockwise direction and the teeth 99 thereof, Fig. 14, snap past the pawls 54; the dial wheels being, at this time, held by suitable detents 100 engaging with toothed wheels 101 secured to said dial wheels 49.

The indexing-pins 51 are restored to their normal positions after each computation. This is done by means of a resetting plate 102 which underlies all of the indexing-pins 51. This plate is raised during the latter part of the return movement of the general-operator 53 to push back all of the pins 51 to their normal or retracted positions. The plate 102 is actuated by a one-way acting pawl 103 pivoted on the rack bar 90 of the general operator 53. This pawl engages with the under side of an arm 104 extending rearwardly from a rock shaft 105 to rock the latter and swing an arm 106 engaging with a finger 107 extending laterally from said resetting plate to raise said plate. The plate 102 is guided to move parallel to itself by a system of mechanism at each side thereof, each system comprising bell-cranks 108 and 109 connected to each other by a link 110; the bell-cranks 109 being swingingly supported on the rock shaft 105 and pivotally connected to ears 111 on said resetting plate; and the bell-cranks 108 being rigidly secured to a rock shaft 112 and pivotally connected to ears 113 on said pin-resetting plate.

To permit the preliminary movements of the rack-bars 50 (to their pin-setting positions), the teeth 99 of each ratchet wheel $50^b$ occupy positions relatively to the spring-pressed pawl 54 on the dial wheel 49, as indicated in Fig. 14, where the next tooth 99 to engage with the pawl 54 is some distance away from the latter. When a rack-bar 50 is set to its subtraction position, as in Fig. 15, it will be seen that the dial wheel 49 is not moved and that the ratchet wheel $50^b$ is rotated to take up the lost-motion between the latter and the pawl 54, Fig. 15.

The tens-carrying from one dial wheel to another is effected during the return-stroke of the general-operator 53, the rack 90 thereof meshing with a gear 114 to drive a pinion 115 which has a one-way driving connection with a carry-over shaft 116 to drive the latter only in a clockwise direction. Said shaft 116 has a set of toothed arms 117 spirally arranged thereon, so that they work *seriatim* when the shaft 116 is rotated. Each arm may engage with an intermediate pinion 118 which is set to an effective position by a tooth 119 on its associated dial wheel 49 when the latter passes to "0" at the sight-opening 47. When the intermediate pinion 118 is set in its effective position, the arm 117 engages therewith to impart a movement thereto, which is transferred, by means of teeth 120, to the toothed wheel 101 and consequently to the dial wheel of next higher denomination, to move the latter through one digit distance. If the dial wheel does not pass to or through "0", the intermediate pinion is not set to an effective position; thus, the arm 117 may pass idly by during the rotation of the carry-over shaft 116.

When the subtraction denomination-selector or dog 56 passes through the computing zone, a tappet $120^a$ thereon is lifted into effective relation with the jacks 66 by a roller $120^b$ on said dog. This moves the driving members or pin-bars 50 forwardly through a greater distance for pin-setting than for addition. Thus, the pins 51 on the pin-bars 50 are brought under another set of pin-setting bars 121 (for convenience herein referred to as negative pin-setting bars). These negative pin-setting bars are used to set up the complement (on the pin-bars) of the number being typed.

To do this, each one of the rock-shafts 79, controlled by the numeral keys from "1" to "8", Fig. 4, has connected thereto a negative pin-setting bar 121 by means of a linkage similar to the one for the positive pin-setting bar 75; said linkage for the negative pin-setting bar comprising a link 122 connected to an upwardly-extending arm 123 on the rock-shaft 79; said link extending between two bell-cranks 124 and 125, to which movement is transmitted thereby to move the negative pin-setting bar 121, carried by said bell-cranks, downwardly and set the pin 51 having the complementary value of the actuated numeral key.

It will be seen that the positive and negative pin-setting bars 75 and 121 are arranged in groups, and one of each kind in each group, and that each group extends parallel to a row of pins having the same value. It will thus be seen that the pin-bars may be set to two positions, namely, addition and subtraction positions, and that when in the addition position, the pins 51 are in register with the positive pin-setting bars 75; and when in the subtraction position, they are in register with the negative pin-setting bars 121.

According to the complementary method of subtraction, when a number is to be subtracted, the complement thereof is added into the register. For example, if 100 should be subtracted from a number in the register, it is necessary, since the complement of 100 is 899, to rotate the dial wheels of units and tens positions through nine digit distances, and the dial wheel of hundreds position through eight digit distances. If the capacity of the register is greater than that of the number to be subtracted, the dial wheels of higher denominational positions are also rotated through nine digit positions. To further illustrate, let it be assumed that the register stands at 4,689,327, and it is desired to subtract 100 therefrom, which is equal to 0,000,100; the complement of this number which is 9,999,899, when added to the number in the register, will cause the subtracted value 4,689,226 to be shown, which is correct, except for one digit in the units denominational position. Mechanism is provided, which will hereinafter be more fully explained, to correct the error in the units position; thus, in the example cited, the register will read 4,689,227.

When a machine of the Underwood-Hanson type, as disclosed in said Minton application, is set to subtraction, the "9" pins on all of the pin-bars are set to their effective positions simultaneously. When, however, the carriage enters the computing zone, the "9" pins carried by those pin-bars, on which other pins are being set, are retracted individually.

I have found it advantageous to set each "9" pin 126 individually as the carriage passes through a computing zone. To do this, I provide each driving member or pin-bar 50 with a "9" pin-setting mechanism which is actuated to depress the "9" pin 126, when the associated pin-bar 50 is moved to its subtraction position. This mechanism preferably comprises an actuating element or lever 127, which, when the pin-bar 50 is moved to the subtraction position (Fig. 10), engages with the cross-bar 52 of the general-operator 53 to swing an intermediate lever 128, by an ear 127ª engaging with said lever 128, the lever 128 being supported on a common fulcrum 129 with the actuating lever 127. The intermediate lever 128 engages with the "9" pin 126 to set the latter in its effective position. If any one of the numeral keys 20, from "1" to "8", inclusive, is actuated, while the pin-bar is in its subtraction position, (Fig. 10), the pin 51 under the negative pin-setting bar 121, associated with the actuated numeral key, will be depressed, and at the same time the "9" pin 126, on said bar, will be retracted.

To retract the "9" pin 126, or, in other words, restore it to its normal position while another pin 51 is being set on the same pin-bar 50, each of the rock shafts 79, associated with the numeral keys 20, has an upwardly-projecting arm 130 at the rear end thereof, which, when said rock-shaft is actuated, engages with a pin or stud 131 projecting forwardly from a link or bar 132, (Figs. 2 and 4), to move the latter leftwardly and swing two bell-cranks 133 and 134 connected thereto, and depress a bar 135 which is carried by said bell-cranks. The downwardly-moving bar 135 engages with a rearwardly-projecting arm 136 of said intermediate lever 128 to actuate the latter and restore the "9" pin 126 to the position in Fig. 11, from the position in Fig. 10. A spring 137 to return the bar 135 to its normal position is connected between the link 132 and the bar 135.

When the pin-bar 50 is moved forward to its subtraction position, the actuating lever 127 is brought to rest upon a rib 138 of the cross-bar 52. During the "9" pin-retracting operation, however, at the depression of a numeral key 20, the actuating lever 127 is removed from said rib 138 by being swung to the Fig. 11 position, where it is located in front of said rib 138.

It will be understood that if the "0" key is actuated, it is effected to print only, and that no computing mechanism is actuated thereby. Consequently, the "9" pin 126 will remain effective in the denominational positions in which the "0" is written.

It will be remembered that on the return stroke of the type-bar 24, the carriage 29 feeds to the next letter-space position. During this movement, the pin-bar 50 returns to its normal or ineffective position, while the next adjacent one moves forward to its pin-setting position. If the "9" pin 126 is left in its depressed position, on the returning pin-bar 50 after the actuation of a numeral key 20, the actuating lever 127 simply moves rearwardly and off the rib 138. If the "9" pin 126 is in its depressed position, during the return of the pin-bar, the actuating lever 127 engages with the rib 138 on the cross-bar of the general-operator, and rocks against the tension of a spring 139 between the intermediate lever 128 and said actuating element 127; the lever 128 being at this time prevented from rocking by the arm 136 which engages with an ear 140 on the pin-bar 50. Suitable detents comprising spring-pressed balls 141 are provided for all of the pins 51 and the "9" pins 126 to hold them in their normal or depressed positions.

After the required combination of pins is set up on the pin-bar 50, the general-operator is moved forwardly, the cross-bar 52 thereof engaging with said pins to move the rack-bars 50 and transfer the proper values to the dial wheels. In moving forwardly, the cross-bar snaps past the actuating levers 127 associated with those "9" pins 126 which have been retracted to permit the said levers to get in back of the rib 138. In Fig. 12 the cross-bar 52 is shown as moving past one of said actuating levers 127.

To transfer the extra digit to the units position of the register, which is necessary in the complementary method of subtraction, as hereinbefore stated, I have provided a toothed wheel 142 (Figs. 2 and 16) adjacent to the units dial wheel 49. The wheel 142 may be rotated through equal angular distances, and each time it is moved, one of a plurality of teeth 143 on said wheel engages with a pinion 144 (Fig. 16), similar to the pinions 118 associated with the dial wheels 49, to set said pinion so that on the return stroke of the general-operator, a toothed arm 145, on the shaft 116, will rotate the pinion 144 and move the dial wheel through a toothed wheel 146 engaging with the toothed wheel 101 of the units dial wheel and move the latter one digit.

The movements of said wheel 142 are dependent upon a special rack-bar 147 adjacent to the units rack-bar 50, and which is geared to the wheel 142 in a way similar to that of the racks 50 and the dial wheels 49. Said rack-bar 147 has a pin 148 thereon and in the same row as the "1" pins 51 of the other rack-bars 50, and is normally in a retracted position (Fig. 16). When, however, the rack-bar 50 of units position is moved forwardly to a subtraction position, the special rack-bar 147 is also moved therewith through the intermediary of a bell-crank 149, which is actuated by the units transposition linkage 72 (Fig. 3). This forward movement of the special rack-bar is effective to swing an actuating member or lever 150 on the rack-bar 147 by engagement with the cross-bar 52, and to swing an intermediate lever 151 engaging with a pin-setting lever 152 to set the pin 148 to bring the lower end thereof into the path of the cross-bar 52 of the general-operator. It will be seen that if the general operator is now moved forwardly, the special rack-bar will be moved forwardly to transmit the required movement to the toothed wheel 142. This movement of the wheel 142 sets the intermediate pinion 144, so that it may be engaged by the arm 145 on the shaft 116, to transmit the required movement to the dial wheel 49 of units position.

The rack-bar 147 is returned to its normal position by the general-operator in the same way as the other rack-bars 50. The pin 148 thereon is restored to its normal position by the pin-restoring plate 102, which, it will be remembered, is actuated by the pawl 103 during the latter part of the return movement of the general operator 53.

Ordinarily, it is desirable to perform addition always in one column and subtraction always in another column; thus, I have provided addition and subtraction dogs 55 and 56, respectively, which are placed lengthwise of the carriage opposite their respective columns. The roller 62 with which the dogs engage to render them effective, ordinarily occupies a position indicated in Fig. 1, and is effective to render each dog effective for the kind of computation to be performed thereby.

It is, however, sometimes desirable to perform the same kind of computation in all of the columns. For this purpose, I have provided means to shift said roller 62 to other positions, (some exclusively for addition and some exclusively for subtraction positions,) and I have so shaped the rollers 61 and 120$^b$ on their respective selectors that said selectors 55 and 56 may be raised by said roller 62 to render each selector effective for addition when the roller 62 is in its addition position, and to render said selectors effective for subtraction when said roller 62 is in its subtraction position.

To shift the roller 62 to its exclusive addition position (Fig. 6), I have provided an "Add" key 153 at the front of the machine, which, when actuated, moves a thrust rod 154 to rock a shaft 155 through an arm 156 thereon. Another arm 157 secured to said rock-shaft moves a link 158 upwardly to swing a cam member 159 about its pivot 160 secured to a tabulator bracket 161, (Fig. 3), and against the tension of a return spring 162 coiled about a hub 163 on said cam member 159. Said cam member 159, during this movement, swings said roller 62 by means of a cam slot 164 into which projects a pin 165 extending laterally from an arm 166 secured to the rock-shaft 64 which carries said roller 62. Said roller 62 is brought to rest in the position shown in Fig. 6, when the pin 165 rests on a dwell 167 in said cam slot 164. The roller 61 on the addition dog near its outer end at 168 is of such a diameter that the dog is raised the same amount when passing over the roller 62, when the latter is in the Fig. 6 position, as when it is in the Fig. 1 position. The outer end 169 of the roller 120$^b$ on the subtraction dog, however, is of such a diameter that it is not raised so high in the latter as in the former position of the roller 62, but the subtraction dog is moved just enough to move the pin-bars 50 to their addition positions.

To shift the roller 62 to its exclusive subtraction position, I have provided a "Sub" key 170 which is also located at the front of the machine (Fig. 3), but preferably at the other or left-hand side thereof. This key is adapted to rock the shaft 155 through the intermediary of a shaft 171 and a U-shaped bar 172 connecting said shafts; said key 170 engaging with an arm 173 on the shaft 171. Thus, the cam member 159, which is connected to the shaft 155, is swung to the Fig. 8 position to bring the roller 62 to its exclusive subtraction position, where it is held by the pin 165 engaging with a dwell 174 in said cam slot 159. The shafts 155 and 171 are supported at their inner ends in the tabulator bracket 161 and at their outer ends in brackets 175 and 176, respectively; said brackets being secured to the main frame 177 of the machine.

It will be seen that the roller 61 on the addition dog 55 is considerably enlarged at its inner end 178; thus, when it passes over the roller 62, when the latter occupies the Fig. 8 position, the dog is moved to a higher position than when the roller 62 is in its Fig. 1 position; consequently, the addition dog 55 moves the pin-bars forward to their subtraction positions.

The roller 62 may also be moved to an ineffective position (Fig. 5) which may be desirable when typing numbers in a column of figures which are not to be run into the register. For this purpose, I have provided a non-compute ("Non-comp") key 179 which is also located at the front of the machine and adjacent to the "Add" key 153 (Fig. 3). This key is adapted to rock the shaft 155 by means of an arm 179$^a$ and swing the cam member 159 until the pin 165 is seated in the lower end of the cam slot 164 and the roller 62 located in the position shown in Figs. 5 and 7.

The addition key may be locked in its actuated position by means of a pin 180 on the thrust bar 154 (Figs. 1 and 3), which drops into a depression 181 of a slot 182 formed in the plate 183 secured to a cover plate 184 of the lower casing 46, which embodies most of the computing mechanism. When the pin 180 reaches the depression 181, the thrust rod 154 is moved downwardly by a spring 185 (Fig. 1), one end of which is connected to a pin 186 projecting laterally from an arm 187 loosely mounted on the rock-shaft 87; the other end being connected to a pin 188; a link 189 being slidingly supported on said loosely-mounted arm 187; the latter being connected to said thrust rod 154. Thus, the "Add" key 153 is held in its actuated position until the operating handle 86 approaches the end of its forward movement when a cam 190, secured to said shaft 87, engages with the lower end of the link 189 to raise the latter against the tension of the spring 185 and the thrust rod 154 upwardly to lift the pin 180 out of the depression 181. A suitable return spring 191 then becomes effective to restore the "Add" key 153 to its normal position.

The "Sub" key 170 and the "Non-comp" key 179 may be held in their actuated positions in a manner similar to that of the "Add" key 153, and the holding means may be released by similar cams 192 and 193, respectively, on the rock-shaft 87. Return springs, like 191 of the "Add" key, may also be provided for the "Sub" and the "Non-comp" keys.

It will be seen that upon the release of either one of the "Add", "Sub" or "Non-comp" keys from actuated position, the cam member 159 is restored to its normal position by the coiled spring 162 and is arrested in said position by the pin 165 engaging the upper end of the cam slot 164.

Inasmuch as the rollers 61 and 120$^b$ serve to position denomination-selectors 55 and 56 and consequently jacks 66, in passing through computing zones, the rollers 61 and 120$^b$ may be called differential devices. Obviously, the denomination-selectors 55 and 56, in connection with their respective rollers 61 and 120$^b$, may be referred to in the same way.

By an inspection of Fig. 3, it will be seen that the arms 156, 173 and 179$^a$, projecting downwardly from the rock-shafts 155 and 171, will all be swung when one of them is actuated by its associated key. I have, therefore, provided slots 194, 195 and 196 in the ends of the respective thrust bars associated with said keys, so that the pins 197, 198 and 199 may move idly in their respective slots. It will also be noted that these slots extend forwardly different distances from said pins. This is done that the cam member may be moved through different angular distances by a uniform movement of the keys.

To avoid any possibility of changing from one kind of computation to another, while the carriage is in a computing zone, there is provided means which prevents the shifting of the roller 62 when the carriage is in such position. This means is preferably controlled by special tappets 200, one on each of the denomination-selectors 55 and 56. When the carriage passes through a computing zone the tappet 200 engages with a shoe 201 on a pivot bail 202 to swing the latter about the fulcrum 68, thus moving a connecting link 203 downwardly against the tension of a spring 204 to swing a pivot locking member 205 from the Fig. 1 position to the Fig. 6 position, where it is in the path of movement of a pin 206 projecting laterally from a pivoted pawl 207; the locking member 205 and pawl 207 being pivoted at 208 and 209, respectively, on a casing 210 which incloses the links or thrust rods 69; the pawl 207 being urged against a sector 211 by means of a spring 212. Said sector 211 is secured to the rock-shaft 155 and is provided with four notches 213 into any one of which the pawl 207 may seat itself, according to the position to which the cam member 159 is moved by said rock-shaft 155. While the pawl 207 is finding the proper notch, it may vibrate back and forth, providing the carriage is outside of a computing zone, at which time the locking member 205 occupies the position shown in Fig. 1.

If, however, after the pawl 207 has seated itself in any one of the notches 213, and the carriage passes into a computing zone, the locking member 205 is swung into the path of the pin 206 on said pawl through the intermediary of the tappet 200 to hold the pawl in the notch and lock the sector 211 and consequently the cam member 159 by the locking member 205; thus, the roller 62 is held against movement while the locking member 205 is effective. As soon as the denomination-selector passes out of the computing zone, however, the spring 204 restores the locking element 205 to its ineffective position, and the shoe 201 of the bail 202 is therefore lowered to its normal position where it may be engaged by the next dog or denomination-selector.

It should be understood that the roller 62, when in its non-compute position, is also locked when a denomination-selector passes through a computing zone. Thus, the operator is compelled to move the carriage to a position outside of the computing zone, in order to change the position of said roller 62.

Two or more registers may be used, as indicated in Fig. 17, in which there may be performed simultaneous addition, simultaneous addition and subtraction, or simultaneous subtraction. To do this, each register has a separate set of addition and subtraction dogs on the typewriter carriage, and the tappets 65 and 120ᵃ on the dogs associated with one register are offset from the front to the back of the machine, relatively to similar tappets on the dogs associated with the jacks of the other register. For this purpose, the sets of jacks 66, associated with the different registers, are of different lengths.

Variations may be resorted to within the scope of the invention, and portions of the improvements may be used without others.

Having thus described my invention, I claim:

1. In a computing machine, the combination with a register, of means for actuating the same comprising a driving element therefor, indexing means to determine the extent of driving movement of said driving element, the effectiveness of said indexing means being determined by the position of said driving element, and means for setting said driving element from an ineffective position to a position for addition-setting or to a position for substraction-setting.

2. The combination of a register, a driving element therefor, indexing pins on said driving element, indexing means, a carriage, and means, including members mounted on said carriage, to move said driving element from an ineffective position to bring said pins to an addition-setting position or to a subtraction-setting position relatively to said indexing means.

3. The combination with a carriage, of denomination-selectors on said carriage, and computing means comprising an element controlled by said carriage and movable thereby at one time to an addition position and at another time to a subtraction position, said positions being dependent upon said denomination-selectors on said carriage.

4. In a computing machine, the combination with a carriage, of differential devices adjustable thereon, and computing means comprising a driving element, settable devices on said driving element, and means controlled by said carriage through said differential devices, to move said driving element to any one of a plurality of preliminary positions in accordance with the differential device in effective position, to enable the setting of said devices in accordance with the kind of computation to be effected.

5. In a computing machine, the combination with a carriage, of computing mechanism comprising a plurality of elements having indexing pins thereon, and carriage-controlled means, including adjustable devices on said carriage, for moving said elements individually from a normal ineffective position to any one of a plurality of preliminary positions, said positions being dependent upon said adjustable devices.

6. In a computing machine, the combination with a carriage, of a totalizer including computing wheels, driving elements for said computing wheels, settable devices on said driving elements, and carriage-controlled means, including differential devices adjustable on said carriage, for moving said driving elements to any one of a plurality of preliminary positions, said positions being dependent upon said differential devices.

7. The combination of a register, denominationally-arranged driving elements for said register, numeral keys, indexing mechanism actuable by said numeral keys, said indexing mechanism being effective to establish different preliminary conditions of said driving elements for different kinds of computation, and means for setting said driving elements to a plurality of positions in accordance with the kind of computation to be effected, so that said conditions may be established by said indexing mechanism.

8. The combination of a register comprising dial wheels, denominationally-arranged pin-bars to drive said dial wheels, pins on said pin-bars, numeral keys, indexing mechanism actuable by said numeral keys, said indexing mechanism being effective to set said pins on said pin-bars, and means for individually setting said pin-bars to a plurality of positions, to determine the manner of setting of said pins by said indexing mechanism, and thereby to determine the kind of computation to be effected.

9. The combination of a carriage, denomination-selectors on said carriage, a register comprising dial wheels, pin-carrying bars associated with and to drive said dial wheels, pins on each pin-carrying bar, numeral keys, and two sets of pin-setting bars controlled by said numeral keys, said pin-carrying bars being controlled by the denomination-selectors on said carriage and movable to a plurality of pin-setting positions to bring the pins on said pin-bars into effective relation with either set of setting bars.

10. The combination of a carriage, two kinds of denomination-selectors on said carriage, a register comprising dial wheels, pin-carrying bars associated with and to drive said dial wheels, pins on each pin-carrying bar, numeral keys, and two sets of pin-setting bars controlled by said numeral keys, one kind of denomination-selectors being effective to render said pins effective with one set of setting-bars, the other kind of denomination-selectors being effective to render said pins effective with the other set of setting bars.

11. The combination of a carriage, an addition dog and a subtraction dog on said carriage, a register comprising denominationally-arranged pin-carrying devices, pins on each pin-carrying device, numeral keys, two sets of pin-setting members controlled by said numeral keys, and means whereby each pin-carrying device is movable by the subtraction dog into effective relation with one of said sets of setting-members, and by the addition dog into effective relation with the other set of setting-members.

12. The combination of a register, denominationally-arranged driving elements for said register, each driving element having a set of pins equal in value from 1 to 9 thereon, the pins of equivalent value on the different driving elements being arranged in rows crosswise of said driving elements, two sets of setting-bars extending parallel to said rows of pins, one setting-bar in each set having a value which is equal to the complement of the value of an associated setting-bar in the other set, and means for setting said driving elements, one at a time, to bring its pins into effective relation with either set of setting-bars.

13. The combination with a register comprising dial wheels, of driving means therefor comprising denominationally-arranged driving elements, means to move said driving elements to indexing positions, a general operator to actuate said driving elements, a universal bar to engage coöperating portions of said driving elements to restore the latter to their normal positions, and means for moving said universal bar out of the path of said coöperating portions of the driving elements as the general operator returns to its normal position, so as to permit movements of said driving elements to indexing positions.

14. The combination with a register comprising dial wheels, of driving means therefor comprising denominationally - arranged driving elements, means to move said driving elements to indexing positions, a general operator to actuate said driving elements, means to restore said driving elements to normal position including a universal bar on the general operator, portions of said driving elements being adapted to coöperate with said universal bar, and means whereby said universal bar is normally held out of the path of said coöperating portions, so as to permit movement of the driving elements to their indexing positions, but is moved into said path during the forward movement of the general operator, so that it may engage with said coöperating portions during the return movement of the general operator.

15. The combination with a register comprising dial wheels, of denominationally-arranged driving elements, means to move said driving elements to indexing positions, a general operator to advance said driving elements, a universal bar on said general operator, said universal bar being normally out of coöperative relation with said driving elements, so as to permit the movements of the latter to their indexing positions, said universal bar being rendered effective during the forward movement of the general operator, so that it may coöperate with said driving elements to restore the letter on the return movement of the general operator, means for rendering said universal bar ineffective during the latter part of the return movement of the general operator, and springs associated with said driving elements to assist in restoring said driving elements during the latter part of their return movements.

16. The combination with a register, comprising dial wheels, of pin-carrying rack-bars associated with said dial wheels, indexing means, mechanism to individually render said rack-bars effective for indexing, a general operator to advance said rack-bars, a pivoted universal bar carried by said general operator, lugs on said rack-bars, with which said universal bar may engage, means to normally hold said universal bar out of effective relation with said lugs, to permit the movements of said rack-bars to indexing positions, and to permit said universal bar to swing into effective relation with said lugs, during the forward movement of the general operator, so that said universal bar may engage with said lugs during the return movement of said general operator to restore said rack-bars to their normal positions, and may be swung to its ineffective position during the latter part of the return movement of the general operator, and springs to assist in moving the rack-bars to their normal positions.

17. The combination with a register, of a driving element associated with said register, a settable device on said driving element, a general operator to move said driving element, a cross-bar on said general operator, an actuator on said driving element for said settable device, means to impart a preliminary movement to said driving element to cause said actuator to engage with said cross-bar and set said settable device, and means for restoring said settable device.

18. The combination with a carriage, of a register, a rack associated with said register, a pin on said rack, an actuator for said pin, a general operator comprising a cross-bar to drive said rack, a setting device on said rack, means to cause a preliminary movement of said rack to bring said actuator into engagement with said cross-bar and thus set the pin on said rack, and means for restoring said pin.

19. The combination of a register, driving elements therefor, settable devices on said driving elements having values from 1 to 9, indexing means, said driving elements being settable to two positions relatively to said indexing means, for addition and subtraction, respectively, each driving element having intermediate mechanism thereon, and means engaging with said intermediate mechanism to set the pin equal to 9 in value, when said driving element is moved to its subtraction position.

20. The combination of a register, driving elements therefor, settable devices on said driving elements having values from 1 to 9, indexing means for said devices, said driving elements being settable to two positions relatively to said indexing means, for addition and subtraction, respectively, each driving element having intermediate mechanism thereon to set the pin equal to 9 in value, when said driving element is moved to its subtraction position, numeral keys to actuate said indexing means, and means controlled by said numeral keys to actuate said intermediate mechanism to restore the pin equal to 9 in value while a pin of any other value is being set on said driving element.

21. The combination of a register, driving elements therefor, settable devices on said driving elements having values from 1 to 9, indexing means, said driving elements being settable to two positions relatively to said indexing means for addition and subtraction, respectively, a general operator, comprising a cross-bar, for moving said driving elements, and intermediate mechanism on each driving element which, when the driving element is moved to its subtraction position, engages with the cross-bar on said general operator to set the device equal to 9 in value.

22. The combination of a register comprising dial wheels, driving racks associated with said dial wheels, indexing pins having values from 1 to 9 on said driving racks, numeral keys, indexing means actuable by said numeral keys, said driving racks being settable to two preliminary positions relatively to said indexing means for addition and subtraction, respectively, each driving rack having thereon an actuator associated with the pin equal to 9 in value, and a general operator, comprising a cross-bar, for moving said driving racks, said actuator engaging with said cross-bar to set the pin equal to 9 in value when the associated driving rack is set to a subtraction position.

23. The combination of a register, driving elements therefor, settable devices on said driving elements, an actuating device on each driving element, each actuating device being associated with the corresponding settable device, a general operator, comprising an engaging portion, to move said driving elements, means to cause a preliminary movement of each driving element to cause the associated actuating device to engage with said general operator and set the settable device, means to render said settable device ineffective when said driving element is in its preliminary position, thus causing said actuating device to snap past the engaging portion of said general operator, said actuating device being effective to yield while said driving element is being restored from its preliminary position to its normal position, and a spring to cause said actuating device to snap in back of the engaging portion of said general operator when the latter is moved.

24. The combination with a register comprising dial wheels, of denominationally-arranged driving members associated with said dial wheels, a special driving member adjacent to the driving member of units position to cause a carry-over operation to the dial wheel of units position, a settable pin equal to 1 in value, a general operator, an actuator for said pin, means to cause said actuator to engage with said general operator to set said pin, and means for restoring said pin.

25. The combination with a register comprising dial wheels, of denominationally-arranged driving elements associated with said wheels, settable pins on each driving element having values from 1 to 9, indexing means, said driving element being settable to two positions relatively to said indexing means, to addition and subtraction positions, respectively, a special driving member adjacent to the driving element of units position to cause a carry-over operation to the dial wheel of units position, a settable pin equal to 1 in value, a general operator comprising a universal bar, and means for simultaneously moving the special driving member and the driving element of units position to a subtraction position, thus causing an actuating element on said special driving member and said driving element of units position to engage with said universal bar and set the pins equal to 1 and 9 in value on their respective driving elements, and means for restoring said pins.

26. The combination of a register, denominationally-arranged driving elements therefor, indexing means, a carriage, an addition element on said carriage, a subtraction element on said carriage, said elements being adjustable to columnar positions on said carriage, a machine frame, and means carried by said machine frame to render said elements effective, one at a time, when the carriage passes through a computing zone, each element being effective to move said driving elements into effective relation with said indexing means, the movements of said driving elements effected by said addition element being different than the movements effected by said subtraction element.

27. The combination of a register, denominationally-arranged driving elements therefor, indexing means, a carriage, an addition dog on said carriage, a subtraction dog on said carriage, said dogs being adjustable to columnar positions on said carriage, a machine frame, and a roller carried by said machine frame for rendering said dogs effective, one at a time, when the carriage passes through a computing zone, each dog being effective to move said driving elements into effective relation with said indexing means, the movements of said driving elements effected by said addition dog being less than the movements effected by said subtraction dog.

28. The combination of a register, a carriage, an addition element on said carriage, a subtraction element on said carriage, a machine frame, a device carried by said machine frame for rendering said elements effective, one at a time, and keys to vary the position of said device, so that said addition and subtraction elements will effect the same kind of computation.

29. The combination of a register, a carriage, an addition element on said carriage, a subtraction element on said carriage, a machine frame, a device carried by said machine frame to render said elements effective, one at a time, and means for varying the position of said device, so that both the addition and subtraction elements will effect the same kind of computation.

30. The combination of a register, denominationally-arranged driving elements therefor, indexing means, a carriage, an addition element on said carriage, a subtraction element on said carriage, a machine frame, a device carried by said machine frame for rendering said elements effective, one at a time, each element being effective to move said driving elements into effective relation with said indexing means, the movements of said driving elements which are effected by said addition element being different than the movements effected by said subtraction element, and means for varying the position of said device, so that said addition and subtraction elements will effect addition or subtraction.

31. The combination of a register, denominationally-arranged racks, pins on said racks, numeral keys, indexing means under the control of said numeral keys, a carriage, an addition dog and a subtraction dog on said carriage, said dogs being adjustable to columnar positions on said carriage, a machine frame, a device carried by said machine frame for rendering said dogs effective, one at a time, when the carriage passes through a computing zone, each dog being effective to move said racks to bring said pins into effective relation with said indexing means, the movements of said racks which are effected by said addition dog being different than the movements effected by said subtraction dog, keys to vary the position of said device, so that all of said dogs will effect the same kind of computation, and a locking device controlled by said dogs to prevent the changing of the position of said device while the carriage is passing through a computing zone.

32. The combination of a register, a carriage, an addition element on said carriage, a subtraction element on said carriage, a machine frame, a device carried by said machine frame for rendering said elements effective, one at a time, means to change the position of said device, so that all of said addition and subtraction elements will effect the same kind of computation, and means to prevent the changing of the position of said device while the carriage is passing through a computing zone.

33. The combination of a register, denominationally-arranged driving elements therefor, indexing means, a carriage, an addition element on said carriage, a subtraction element on said carriage, said elements being adjustable to columnar positions on said carriage, a machine frame, a device carried by said machine frame for rendering said elements effective, one at a time, when the carriage passes through a computing zone, each element being effective to move said driving elements into effective relation with said indexing means, the movements of said driving elements which are effected by said addition element being different than the movements effected by said subtraction element, means for varying the position of said device, so that all of said addition and subtraction elements will effect the same kind of computation, and means to prevent the changing of the position of said device while the carriage is passing through a computing zone.

34. The combination of a register, a carriage, a subtraction dog and an addition dog on said carriage, a machine frame, a device on said machine frame to render said dogs effective, one at a time, when the carriage passes through a computing zone, each dog being provided with a tappet, the tappets being effective while the carriage is traveling in a letter-feed direction and through a computing zone, means to shift said device to a position where all of the dogs will be rendered effective thereby for addition, means to shift said device to another position where all of said dogs will be rendered effective thereby for subtraction, and a locking device, said locking device being rendered effective by said tappets to prevent the shifting of said device from one position to another while said carriage passes through a computing zone.

35. The combination of a carriage, addition and subtraction dogs on said carriage, a machine frame, a device on said machine frame with which said dogs coöperate to render the latter effective, one at a time, as the carriage passes through a computing zone, a cam member to move said device to various positions, keys to actuate said cam member by which it may be moved to various positions, said keys engaging with a rock-shaft, a sector on said rock-shaft, a detent pawl engaging with said sector, a locking device, and means through which said locking device may be rendered effective by any one of said dogs to prevent the shifting of said device from one position to another while the carriage passes through a computing zone.

36. The combination of a carriage, addition and subtraction dogs on said carriage, a machine frame, a device on said machine frame with which said dogs coöperate to render the latter effective, one at a time, as the carriage passes through a computing zone, a cam member to move said device to various positions, keys to actuate said cam member by which it may be moved to various positions, said keys engaging with a rock-shaft, a sector on said rock-shaft, a detent pawl engaging with said sector, a locking device, means through which said locking device may be rendered effective by any one of said dogs to prevent the shifting of said device from one position to another while the carriage passes through a computing zone, and individual locking means associated with each key to hold it in its actuated position.

37. The combination of a carriage, addition and subtraction dogs on said carriage, a machine frame, a device on said machine frame with which said dogs coöperate to render the latter effective, one at a time, as the carriage passes through a computing zone, a cam member to move said device to various positions, keys by which said cam member may be moved to various positions, said keys engaging with a rock-shaft, a notched sector on said rock-shaft, a detent pawl engaging with said sector, a locking device, means through which said locking device may be rendered effective by any one of said dogs to prevent the shifting of said device from one position to another while the carriage passes through a computing zone, individual locking means associated with each key to hold it in its actuated position, an operating handle, and means controlled by said operating handle to release the actuated key.

38. The combination of a carriage, addition and subtraction dogs on said carriage, a machine frame, a device on said machine frame with which said dogs coöperate to render the latter effective, one at a time, as the carriage passes through a computing zone, a cam member to move said device to various positions, keys to actuate said cam member by which it may be moved to various positions, said keys engaging with a rock-shaft, a notched sector on said rock-shaft, a detent pawl engaging with said sector, a locking device, means through which said locking device may be rendered effective by any one of said dogs to prevent the shifting of said device from one position to another while the carriage passes through a computing zone, individual locking means associated with each key to hold it in its actuated position, an operating handle, means controlled by said operating handle to release the actuated key, and a return spring for said cam member to restore it to its normal position after the release of said key.

39. The combination of a carriage, addition and subtraction dogs on said carriage, a machine frame, a device on said machine frame with which said dogs coöperate to render the latter effective, one at a time, as the carriage passes through a computing zone, a cam member to move said device to various positions, keys to actuate said cam member, said keys engaging with a rock-shaft, a notched sector on said rock-shaft, a detent pawl engaging with said sector, a locking device, means through which said locking device may be rendered effective by any one of said dogs to prevent the shifting of said device from one position to another while the carriage passes through a computing zone, individual locking means associated with each key to hold it in its actuated position, an operating handle, means controlled by said operating handle to release the actuated key, a return spring for said cam member to restore it to its normal position after the release of said key, each key being actuable independently of the others and effective to impart a different degree of movement to said rock-shaft and consequently to said cam member, and individual return springs for said keys.

40. The combination of a carriage, a register comprising dial wheels, denominationally-arranged driving elements, pins on said driving elements, indexing means, an addition element and a subtraction element on said carriage, a machine frame, a device carried by said machine frame to render said addition and subtraction elements effective, one at a time, when the carriage passes through a computing zone, to move said driving elements individually into effective relation with said indexing means, the movements of said driving elements, effected by said addition element, being different than the movements effected by said subtraction element, a cam member to move said device to various positions, keys to actuate said cam member, said keys engaging with a rock-shaft, a sector on said rock-shaft, a detent engaging with said sector, a locking device, and means through which said locking device may be rendered effective by any one of said addition and subtraction elements to prevent the shifting of said device from one position to another while the carriage passes through a computing zone.

41. The combination of a carriage, a register comprising dial wheels, denominationally-arranged driving elements, pins on said driving elements, indexing means, an addition element and a subtraction element on said carriage, a machine frame, a device carried by said machine frame to render said addition and subtraction elements effective, one at a time, when the carriage passes through a computing zone, to move said driving elements individually into effective relation with said indexing means, the movements of said driving elements, effected by said addition element, being different than the movements effected by said subtraction element, a cam member to move said device to various positions, keys to actuate said cam member, said keys engaging with a rock-shaft, a sector on said rock-shaft, a detent engaging with said sector, a locking device, means through which said locking device may be rendered effective by any one of said addition and subtraction elements to prevent the shifting of said device from one position to another while the carriage passes through a computing zone, a general operator for said driving elements, individual locking means associated with each key to hold it in its actuated position, and means controlled by said general operator to release the actuated key.

42. The combination of a carriage, a register comprising dial wheels, denominationally-arranged driving elements, pins on said driving elements, numeral keys, indexing means actuable by said numeral keys, an addition element and a subtraction element on said carriage, a machine frame, a device carried by said machine frame to render said elements effective, one at a time, when the carriage passes through a computing zone to move said driving elements into effective relation with said indexing means, the movements of said driving elements, effected by said addition element, being different than the movements effected by said subtraction element, a cam member to move said device to various positions, keys to actuate said cam member, said keys engaging with a rock-shaft, a sector on said rock-shaft, a detent engaging with said sector, a locking device, means through which said locking device may be rendered effective by any one of said addition and subtraction elements to prevent the shifting of said device from one position to another while the carriage passes through a computing zone, a general operator for said driving elements, individual locking means associated with each key to hold it in its actuated position, means controlled by said general operator to release the actuated key, a return spring for said cam member to restore it to its normal position after the release of said key, each key being actuable independently of the others and effective to impart a different extent of rotative movement to said rock-shaft and consequently to said cam member, and individual return springs for said keys.

43. In a computing machine, the combination with two registers, of driving elements, one set for each register, settable devices on each of said elements, indexing means for setting said devices for either addition or subtraction, two sets of dogs mounted on said carriage, said sets of dogs being effective only for their respective registers, and means whereby the dogs of either set may move the driving elements of the corresponding register to either addition position or to subtraction position with reference to said indexing means, irrespective of the effective position given to the driving elements of the other register.

44. In a computing machine, the combination with traveling carriage, of a series of denominational jacks, a selector-dog on said carriage normally in ineffective position, a dog-controlling member to move the dog to effective position upon entering a computing zone, means whereby said dog-controlling member may be moved to an ineffective or non-compute position, and means for preventing a shifting of said dog-controlling member from an effective to an ineffective or non-compute position, during the passage of said dog through the computing zone.

45. In a computing machine, the combination with a register, of actuating means therefor including a series of driving elements, a series of settable devices, of different values, on each of said driving elements, indexing means adapted to set said settable devices for addition or for subtraction in accordance with one or the other of two positions assumed by the driving elements with reference to the indexing means, and means whereby movement of a driving element to its subtraction position will effect a setting of the settable device of highest value, on that driving element.

46. In a computing machine, the combination with a register, of actuating means therefor including a series of driving elements, a series of settable devices, of different values, on each of said driving elements, indexing means adapted to set said settable devices for addition or for subtraction in accordance with one or the other of two positions assumed by the driving elements with reference to the indexing means, means whereby movement of a driving element to its subtraction position will effect a setting of the settable device of highest value, on that driving element, and means whereby, upon a setting of any other settable device on the driving element in subtraction position, the settable device of highest value, on that driving element, will be restored to normal position.

47. In a computing machine, the combination with a register, of actuating means therefor including a series of driving elements, a series of settable devices, of different values, on each of said driving elements, means for moving each of said driving elements to a position to enable a setting of said settable devices for addition, or to a position for subtraction-setting, means whereby a setting of the settable device of highest value, on a driving element, will be effected upon movement of the latter to a subtraction position, indexing means for setting said settable devices for addition when the driving elements are in addition position, and for subtraction when in subtraction position, and means actuated by said indexing means for restoring the settable device of highest value, on a driving element, when any other settable device thereon is set with the driving element in subtraction position.

48. In a computing machine, the combination with a register, of actuating means therefor including a series of driving members, a series of settable devices on each of said driving members, means for advancing said driving members from normal ineffective positions to enable said settable devices to be set for addition or subtraction, a general operator to drive said driving members in accordance with the setting of said settable devices, and mechanism for indexing said settable devices for addition or complementary subtraction including means to set the settable device of highest value on a driving member when the latter is advanced for a subtraction-setting, and means for restoring to normal position the settable device of highest value, on a driving member when another settable device thereon is set in effecting a setting for complementary subtraction.

49. In a computing machine, the combination with a register, of actuating means therefor adapted to effect complementary subtraction, comprising a series of driving members, a series of settable devices on each of said driving members, means to move said driving members *seriatim* from a normal ineffective position to a position effective to index for subtraction, means rendered effective by the advancing movement of each of said driving members to subtraction-setting position to set the settable device of highest value, and means for effecting a complementary subtraction-setting of said settable devices including means for restoring the settable device of highest value on each driving member on which another settable device is set.

ARTHUR A. JOHNSON.

Witnesses:
 ELLA A. JOLIDON,
 CATHERINE A. NEWELL.